Feb. 1, 1955  E. CAVALIERI  2,701,106

MACHINE FOR THE FINAL WORKING UP OF CHOCOLATE

Filed Nov. 28, 1950

INVENTOR.
EMILIO CAVALIERI
BY
Bertram Ottinger
ATTORNEY

United States Patent Office 2,701,106
Patented Feb. 1, 1955

2,701,106

MACHINE FOR THE FINAL WORKING UP OF CHOCOLATE

Emilio Cavalieri, Milan, Italy, assignor to S. A. Macchine Industria Dolciaria Carle & Montanari, Milan, Italy Application November 28, 1950, Serial No. 197,851

Claims priority, application Italy April 26, 1950

7 Claims. (Cl. 241—126)

It is known that for the manufacture of chocolate, cocoa and sugar with eventually some flavouring matters are mixed during a first stage by means of a mixing machine whose object is to crush and pulverize the mixture through the rubbing of rotating organs so as to render it ever so finer and homogeneous.

The mass of chocolate so rolled up by the mixer is subsequently transferred to another machine for the final working up of the chocolate in order to render it more fluid, for eliminating the last traces of humidity and to evenly distribute the flavouring matters, previous to casting it in the tin molds that permit to obtain different shapes.

There are already known machines intended to accomplish this last stage of the manufacture, consisting in rollers freely rotatable and revolving against the internal surface of a frusto-conical inverted shell located inside of a working container of the paste, which is caused to be subjected to a crushing action between the surfaces of said rollers and the internal surface of the frusto-conical shell by means of a central shaft which by its own rotation trains said rollers along by supporting means fastened to said shaft, while the paste is caused to be continuously stirred up and conveyed into the frusto-conical shell through the open base of the latter, by means of rotating arms placed in correspondence with the base of said frusto-conical shell.

It has already been proposed by the applicant a type of machine of this kind, in which the paste grinding rollers are freely mounted on their respective shafts, which are set oblique to the geometrical axis of rotation of the shaft which imparts a rotary motion to said rollers, and are spring-mounted in a direction radial to their axis. Namely, the roller shafts are located almost parallel with the generating line of the internal conical surface of the frusto-conical shell, one end of said shafts being articulated to a supporting arm fixed to the central shaft, while the opposite end is given the possibility of sliding in its carrier under thrust exerted by a compression spring whose strength may be adjusted.

Generally, in the known types of machines of this kind the rollers rotate around their geometrical axes by effect of the friction created by the matter composing the chocolate mixture being forced against the surface of the rollers and that of the opposite frusto-conical shell.

It has been found out in practice that during the work when the paste became a little fluid, the necessary friction between the paste itself and the crushing surface of the rollers falling down, the latter do not revolve, viz. they do not turn on themselves and therefore do not work, the coefficient of efficiency developed at the beginning, when the rollers worked with a rather hard paste, thus diminishing in a strong measure.

This is explained by the fact that there are in the paste some fatty matters which naturally melt under the action of heat, thus rendering the paste fluid, which by slipping over the conical surface of said rollers causes an absence of friction with the latter, which friction is necessary in order to cause them to rotate on themselves for carrying out the work of crushing and refining the paste.

The present invention relates to this latter type of machine employed for the final working up of chocolate and proposes itself mainly to ensure in any case the rotation of the grinding rollers on themselves, and therefore their efficacious action during the operation of the machine so as to attain a high coefficient of efficiency, still being simple in construction and sure in operation.

These and other aims are attained by the present invention which is essentially characterized by means apt to mechanically communicate to the rollers two movements, one of them being of revolution around the motor shaft of the machine, and the other being of revolution around their own axes, so as to exert the action of grinding by mechanical effect.

According to the novel concept above exposed, the action of the rollers is rendered positive in every case, and this independently from the condition in which the mixture being worked on may find itself, as the rollers themselves are mechanically operated in their two combined movements, of rotation and of revolution.

To this end, two or more rollers rigidly fastened to their shafts are set free to rotate in corresponding seats carried by a supporting organ fastened to the main (motor) shaft of the machine in such a way that as said shaft is caused to revolve the rollers are made to revolve around the geometrical axis of the latter, the rotational motion of the roller (or rollers) around their own axis being obtained by means of a gear fastened to said roller (or rollers), receiving its motion from a conveniently designed gear.

In one mode of realization of the gearing, an opportunely designed planetary train of toothed gears is employed for transferring motion to the gear fastened onto the shaft (or shafts) of the rollers.

On the basis of the above described novel concept it is possible to devise numerous forms of construction.

In a practical mode of construction of the afore mentioned conception, to the free end of the roller shaft (or shafts) is fastened a gear in mesh with a planet pinion, which in its turn meshes with the teeth of a central gear co-axial with the main (motor) shaft of the machine and fastened on supporting means independent from said main (motor) shaft.

The center gear with which mesh the planet pinions is preferably fastened to a hub belonging to the frame carrying the vertical rods holding the internal container, which is slowly made to turn by means known in the art.

In order to allow the roller (or rollers) to conserve a constant adherence to the internal surface of the opposed annular frusto-conical shell, the shaft (or shafts) of the rollers with their respective gears have the possibility to slide axially, their constant working position being ensured by means of the pressure of a spring exerted axially on the rollers themselves.

To this end the roller (or rollers) are disposed with their axis parallel to the geometrical axis of the central shaft, and are constantly urged to adhere with their outer surface to the corresponding internal annular surface of the frusto-conical shell by means of the pressure of a spring, which acts with one end on the larger surface of the rollers and rests with the opposite end against a means fast to the support of the rollers themselves.

In a realization of the support of the roller shafts and of the planet pinion pins, said support is made with a box-like body keyed to the central shaft of the machine, provided with hubs for holding the roller shafts, the geometrical axes of said hubs being disposed at right angles to the internal surface of the box, which also carries the seats for the pins of the planet pinions.

Preferably, the larger base of the rollers has a collar, co-axial with the roller shaft itself and sufficiently large to allow of letting in the end of the hub supporting the shaft relative to its own roller, and has, besides, a possibility for receiving one end of the pressure spring, while the other end of said spring rests against an annular seat fastened to the hub of the box supporting said roller shafts.

The novel features of the invention will now be disclosed in greater detail as embodied in a form of construction, which is nothing but an example and illustrated in the accompanying drawing, in which.

Figure 1:
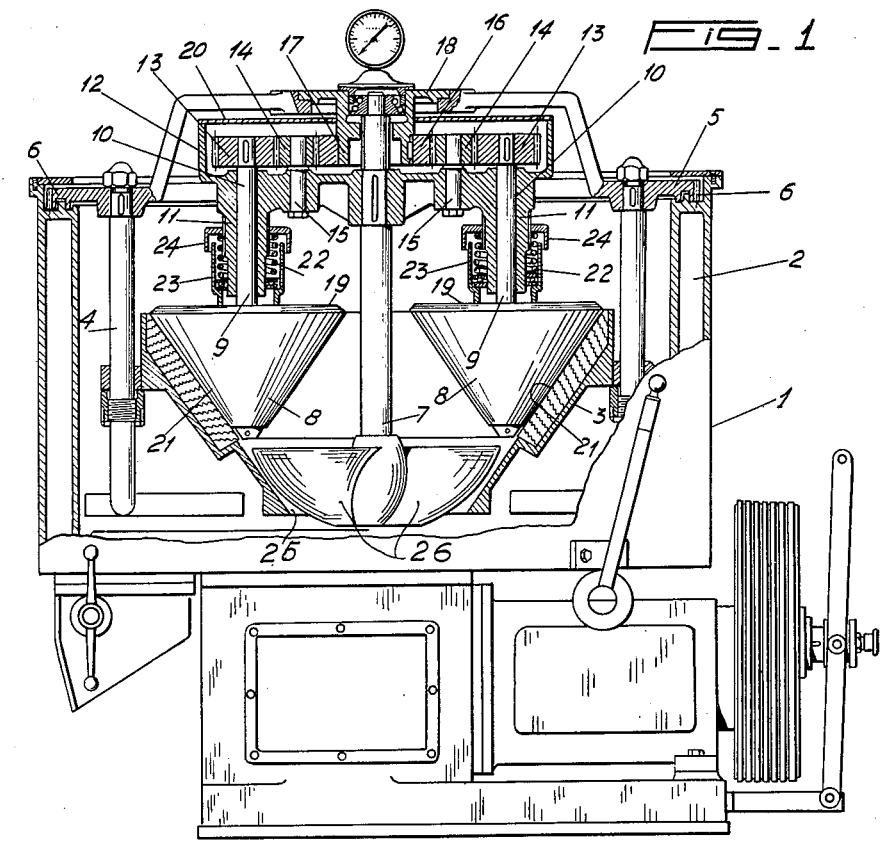
Fig. 1 shows a machine built according to the invention, on a reduced scale, and partly sectioned.
Figure 2:
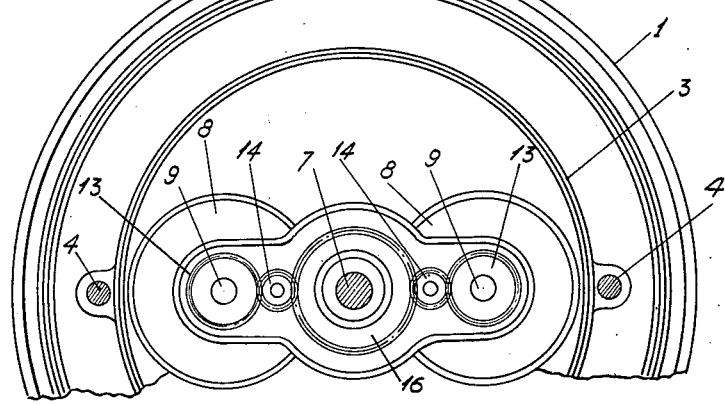
Fig. 2 represents a horizontal section made through the cover and the plane passing between the upper faces of the gears causing the rotation of the rollers around their axis.

With reference to the accompanying drawing, 1 shows the outside container, which in this instance is cylindrical in form, 2 is the annular inter-space for a means for heating the chocolate paste, hot water for instance, and 3 the internal frusto-conical inverted receiver, which is made to slowly revolve through a number of rods 4 fixed to the frame forming the cover, which is made to revolve slowly, in its turn as said before, by means of a pinion not shown in the drawing, meshing with a peripherical set of teeth on said frame 5, which are elements of known art.

The main or motor shaft of the machine is indicated by 7 and it causes to rotate around its own geometrical axis the frusto-conical rollers 8, which also are elements of known art.

As previously hinted at, in the known type of machine the grinding rollers 8 were loose and had their axis oblique respective the geometrical axis of the main shaft, while the constant adherence or pressure on the paste was obtained by a side thrust of said rollers in a direction transverse to their axes of support.

The innovation, according to the invention, consists in a different solution, such as to ensure in every case the rotation of said rollers around their axes for crushing the paste. To this end, each shaft 9 of rollers 8 is contained in its individual holder 10 in a hub projecting from a box-like body 12, and is provided at its free end with a gear 13 meshing with a planet pinion 14 supported by its pin 15 fixed in box 12, which pinion in its turn is in mesh with the teeth of a gear 16 co-axial with the central shaft of the machine 7.

Box 12 is keyed to shaft 7.

Gear 16 is fastened to a hub 17 made fast to the center part 18 of cover 5.

Shafts 9 of the grinding rollers 8 are placed with their geometrical axes parallel to the geometrical axis of the central shaft and are free to slightly slide axially in order to execute with ease the crushing of the paste, even in case the latter were not homogeneous.

For this, hub 11 ends at a certain distance from surface 19 of the rollers, so as to permit gear 13, fastened to the end of shaft 9, to effect a small axial movement; at a convenient distance from the upper face of said gear there is provided a cover 20 for box 12.

The pressure that rollers 8 must exert over the chocolate paste is obtained by the effect of the action of a spring 22 located in a chamber 23 encircling hub 11, over whose stepped bottom rests one end of said spring, while the other end rests against a cup 24 fast to hub 11, which cup may, for instance, be screwed onto said hub, in such a way that rollers 8 are at all times urged against the internal surface 21 of the frusto-conical shell 3.

From the foregoing description the operation of the machine, according to the invention, may easily be understood.

Central shaft 7 by its rotation causes also box 12, fast to it, to rotate, and consequently also the complex depending from it, viz. rollers 8 with the gears 13 and planet pinions 14; the latter being in mesh with central gear 16, pinions 13 of rollers 8 will consequently be caused to rotate, and they will therefore rotate in any case, independently from the condition of fluidity of the paste, which is conveyed through the lower opening 25 of container 3, by means of arms 26 fixed to shaft 7.

As the frame 18—5 and consequently gear 6 revolve slowly in respect with the number of turns of shaft 7, it is practically the same as if toothed gear 6 were at a standstill. Naturally, in case that between the surface of conical rollers 8 and the opposite surface 21 of the frusto-conical container 3 there arrived portions of paste not yet fluidified, rollers 8 will displace themselves accomplishing an axial movement constantly under the pressure of springs 22, always conserving their rotating motion around their axis, as well as that of rotation around the axis of the central shaft.

Though an embodiment of the machine according to the invention has been described, it is understood that in practice many more may be thought of, always based on the essential conceptions of the present invention, without going out, however, of the range of protection of the object of the invention.

I claim:

1. A machine for the final working up of chocolate, said machine comprising a drive shaft, means supporting said shaft for revolution about its longitudinal axis, a receiver disposed symmetrically about the longitudinal axis of said shaft, said receiver having side walls which slope upwardly and outwardly, a second shaft offset from and parallel to said first shaft, means rotatably supporting said second shaft, means connecting said rotatable supporting means to said drive shaft whereby as the drive shaft turns the second shaft will revolve about it, a kinematic train interconnecting said shafts to positively rotate said second shaft about its longitudinal axis when the drive shaft revolves about its longitudinal axis, a grinding roll carried by the second shaft and symmetrical about the longitudinal axis thereof, said roll riding on the side walls of the receiver and being revolved about the longitudinal axis of the drive shaft and rotated about the longitudinal axis of the second shaft independently of its engagement with said side walls, means mounting the grinding roll for shiftable movement parallel to the longitudinal axis of the second shaft, and means biassing the grinding roll in the direction of shifting toward the receiver.

2. A machine for the final working up of chocolate, said machine comprising a vertical drive shaft, means supporting said shaft for revolution about its longitudinal axis, a receiver disposed symmetrically about the longitudinal axis of said shaft, said receiver having side walls which slope upwardly and outwardly, a second vertical shaft offset from said first shaft, means rotatably supporting said second shaft, means connecting said rotatable supporting means to said drive shaft whereby as the drive shaft turns the second shaft will revolve about it, a kinematic train interconnecting said shafts to positively rotate said second shaft about its longitudinal axis when the drive shaft revolves about its longitudinal axis, a grinding roll carried by the second shaft and symmetrical about the longitudinal axis thereof, said roll riding on the side walls of the receiver and being revolved about the longitudinal axis of the drive shaft and rotated about the longitudinal axis of the second shaft independently of its engagement with said side walls, means mounting the grinding roll for shiftable movement parallel to the longitudinal axis of the second shaft, and means biassing the grinding roll in the direction of shifting toward the receiver.

3. A machine as set forth in claim 2 wherein the kinematic train is a gear train.

4. A machine as set forth in claim 2 wherein the kinematic train includes a gear concentric with the drive shaft and relative to which said shaft turns, and a second gear carried by the means connecting the rotatable supporting means to the drive shaft whereby, when the drive shaft turns, the second gear is caused to turn by its revolution about the drive shaft.

5. A machine as set forth in claim 2 wherein a container is provided in which the receptacle is located, wherein the receiver has an open top and bottom, and wherein blades carried by the drive shaft are disposed in the open bottom of the receiver for conveying fluid chocolate therethrough.

6. A machine of the character described comprising a vertical drive shaft, a container, a receiver disposed in said container and arranged symmetrically about the longitudinal axis of said drive shaft, said receiver having upwardly and outwardly sloping side walls and an open top and bottom, a member secured to the upper end of said drive shaft, a vertical journal in said member displaced from said drive shaft, a second shaft in said journal, a grinding roll on the lower end of said second shaft and riding on the side walls of the receiver, a central gear concentric with said drive shaft and relative to which said shaft turns, a planet gear carried by said member, said planet gear meshing with said central gear, a pinion secured to the second shaft and meshing with the planet gear whereby when the drive shaft is revolved about its longitudinal axis it will revolve the roll about said drive shaft and at the same time rotate the roll about the longitudinal axis of the second shaft independently of the engagement of said roll with the side walls of the receiver, means mounting the grinding roll for shiftable movement parallel to the longitudinal axis of the second shaft, and means biassing the grinding roll in the direction of shifting toward the receiver.

7. A machine of the character described comprising a container, a receiver in said container, said receiver having an open top and bottom, a grinding roll in said receiver and engaging the walls thereof, blades in the open bottom of said receiver for conveying fluid therethrough, and means to turn said blades relative to said receiver.

References Cited in the file of this patent

UNITED STATES PATENTS

| Number | Name | Date |
|---|---|---|
| 40,406 | Hansbrow | Oct. 27, 1863 |
| 589,036 | Seymour | Aug. 31, 1897 |
| 814,961 | Hurry | Mar. 13, 1906 |
| 2,413,793 | Sharp | Jan. 7, 1947 |

FOREIGN PATENTS

| 367,548 | Great Britain | Feb. 25, 1932 |